United States Patent [19]

Watanabe et al.

[11] Patent Number: 4,626,517

[45] Date of Patent: Dec. 2, 1986

[54] HIGH TOUGHNESS SINTERED BODIES

[75] Inventors: Masakazu Watanabe; Satoshi Iio; Yasushi Matsuo, all of Aichi, Japan

[73] Assignee: NGK Spark Plug Co., Ltd., Aichi, Japan

[21] Appl. No.: 701,646

[22] Filed: Feb. 14, 1985

Related U.S. Application Data

[63] Continuation of Ser. No. 408,086, Aug. 13, 1985, abandoned.

[30] Foreign Application Priority Data

| Aug. 13, 1981 | [JP] | Japan | 56-127004 |
| Aug. 13, 1981 | [JP] | Japan | 56-127005 |
| Aug. 25, 1981 | [JP] | Japan | 56-132934 |

[51] Int. Cl.$^4$ .................... C04B 35/58; C04B 35/48
[52] U.S. Cl. ................ 501/96; 501/103; 501/104
[58] Field of Search ............... 501/96, 103, 105, 104

[56] References Cited

U.S. PATENT DOCUMENTS

| 3,652,304 | 3/1972 | Daniels | 501/96 |
| 4,218,253 | 8/1980 | Dworak et al. | 501/92 |
| 4,221,650 | 9/1980 | Friese et al. | 501/105 |
| 4,316,964 | 2/1982 | Lange | 501/105 |
| 4,360,598 | 11/1982 | Otagiri et al. | 501/103 |

Primary Examiner—Mark L. Bell
Attorney, Agent, or Firm—Sughrue, Mion, Zinn, Macpeak & Seas

[57] ABSTRACT

A high toughness sintered body is described, consisting essentially of from 40 to 99.5% by weight of Component A, and 0.5 to 60% by weight of Component B, wherein the mean grain size of the sintered body is 3 microns or less, and Components A and B are as follows:

Component A: $ZrO_2$ containing a stabilizer, such as $Y_2O_3$, CaO, and MgO, in which the fraction of the tetragonal and cubic $ZrO_2$ constitutes at least 90% by weight, and the ratio of the tetragonal $ZrO_2$ to the cubic $ZrO_2$ is at least $\frac{1}{8}$; and Component B: at least one of $Al_2O_3$ and TiN, with impurities being 3% by weight or less of $SiO_2$, 0.5% by weight or less of $Fe_2O_3$, and 0.5% by weight or less of $TiO_2$, provided that the total amount is 3% by weight or less.

4 Claims, 5 Drawing Figures

HIGH TEMPERATURE STRENGTH

HIGH TEMPERATURE STRENGTH

HIGH TEMPERATURE STRENGTH

HIGH TEMPERATURE STRENGTH

HIGH TEMPERATURE STRENGTH

HIGH TOUGHNESS SINTERED BODIES

This is a continuation of application Ser. No. 408,086, filed Aug. 13, 1985, now abandoned.

FIELD OF THE INVENTION

The present invention relates to high toughness sintered bodies comprising at least one of $ZrO_2$ and $HfO_2$, at least one of $Al_2O_3$ and TiN, etc.

BACKGROUND OF THE INVENTION

Production of ceramic materials having improved flexural strength has been the subject of research by many investigators, because poor flexural strength is a most serious disadvantage of ceramic materials, and if ceramic materials having improved flexural strength can be developed, they can be effectively used in the fabrication of cutting tools, as synthetic bone materials, as parts for internal combustion engines, and so forth.

For example, Japanese Patent Application (OPI) No. 140762/80 (the term "OPI" as used herein refers to a "published unexamined Japanese patent application") discloses "zirconia-base cutting tool materials" comprising $ZrO_2$ partially stabilized with oxides of Y, Ca, Mg, etc., in which the total fraction of tetragonal and cubic $ZrO_2$ is from 60 to 95% by weight. J. S. Reed et al., Ceramic Bulletin, Vol. 55, page 717 (1976) describes that high strength $ZrO_2$ sintered bodies can be obtained by sintering fine powdered $ZrO_2$ which is prepared by co-precipitating a mixture of $ZrOCl_2$ and $YCl_3$, calcining the thus-formed powder, and stabilizing with $Y_2O_3$.

These ceramic materials, however, are not completely satisfactory in strength, and it has, therefore, been desired to further increase the strength, because it is expected that such improved ceramic materials would have a wider variety of uses.

SUMMARY OF THE INVENTION

As a result of extensive investigations to further increase the strength of such ceramic materials, it has been found that when $Al_2O_3$, TiN, or a combination thereof is added to form a solid solution in combination with $ZrO_2$ ("$ZrO_2$" as used herein generally is intended also to refer to $ZrO_2$ wherein $HfO_2$ is substituted in part or in whole therefor) or is dispersed in $ZrO_2$, the transformation temperature of $ZrO_2$ between the tetragonal $ZrO_2$ and the monoclinic $ZrO_2$ is lowered and grain growth of $ZrO_2$ is prevented, which increases the fraction of tetragonal $ZrO_2$, the sliding resistance among $ZrO_2$ grains in the grain boundaries, and hardness, and, furthermore, increases the high temperature (up to 1200° C.) strength to as high as about 2 times the strength of $ZrO_2$ alone.

The present invention, therefore, relates to a high toughness sintered body consisting essentially of from 40 to 99.5% by weight Component A and from 0.5 to 60% by weight Component B, wherein the mean grain size of the sintered body is 3 microns or less, wherein:

Component A is partially stabilized $ZrO_2$ (containing, e.g., a stabilizer such as $Y_2O_3$, CaO and MgO) in which the fraction of the tetragonal and cubic $ZrO_2$ are at least 90% by weight, and the ratio of the tetragonal $ZrO_2$ to the cubic $ZrO_2$ is at least $\frac{1}{3}$; and Component B is at least one of $Al_2O_3$ and TiN, with impurities being 3% by weight or less $SiO_2$, 0.5% by weight or less $Fe_2O_3$, and 0.5% by weight or less $TiO_2$, provided that the total amount of impurities is 3% by weight or less (based on the total weight).

According to a preferred embodiment of the invention, it has been found that when a co-precipitation method is employed to prepare a raw material consisting essentially of the components of $ZrO_2$ (and/or $HfO_2$), stabilizer, and $Al_2O_3$ (and/or TiN) the resulting raw materials are dispersed more ideally, and by using the resulting raw materials, a sintered boby can be obtained which has a uniform structure comprising fine grains, contains almost no micropores, and which has a strength as high as about 150 kg/mm² that could not be expected from conventional ceramic materials.

DETAILED DESCRIPTION OF THE INVENTION

In the high toughness sintered body of the invention, if the $Al_2O_3$ or TiN content is less than 0.5% by weight, the effect of the addition of $Al_2O_3$ or TiN is poor respectively, whereas if it is more than 60% by weight, $ZrO_2$ content is too low to give effect of strengthening and toughening due to $ZrO_2$ phase transformation.

Furthermore, the total fraction of the tetragonal $ZrO_2$ and the cubic $ZrO_2$ in the $ZrO_2$ should be at least 90% by weight thereof. When the fraction is less than 90% by weight, the toughness of the resulting sintered body is poor. It is also necessary that the ratio of the tetragonal $ZrO_2$ to the cubic $ZrO_2$ be at least $\frac{1}{3}$. If the ratio is less than $\frac{1}{3}$, the resulting sintered body has poor toughness. It is further required for the mean grain size of the sintered body to be 3 microns or less. If the mean grain size is more than 3 microns, the transformation from the tetragonal $ZrO_2$ to the monoclinic $ZrO_2$ will occur, resulting in a reduction in toughness.

The tolerable amounts of impurities are up to 3% by weight in the case of $SiO_2$ and up to 0.5% by weight each in the case of $Fe_2O_3$ and $TiO_2$, provided that the total amount of such impurities is 3% by weight or less. If the amount of each impurity or the total amount of impurities is more than the above-specified values, sintering properties are reduced, and only a sintered body having poor toughness can be obtained.

The same characteristics as above can also be obtained when part or all of the $ZrO_2$ is replaced by $HfO_2$.

The following examples are given to illustrate the invention in greater detail.

EXAMPLE 1

To a monoclinic $ZrO_2$ having the characteristics shown in Table 1 were added $Y_2O_3$, CaO, or MgO as a stabilizer in the proportions shown in Table 2, and then fine particles of $Al_2O_3$ having a mean particle size of 0.1 micron and a purity of 99.9% were added in proportions as shown in Table 2. The ingredients were then wet-mixed, and the resulting mixture was dried, powdered, press-molded, and sintered in an electric furnace in the air at 1,400° to 1,650° C. for 1 hour. After sintering, the thus-obtained sintered body was cut and ground to form a specimen of 4×8×25 mm. In this way, a series of specimens were produced. The phase composition and properties obtained from these specimens are shown in Table 2. In all the specimens, the mean grain size was less than 3 microns. When the sintering temperature was increased to higher temperatures than those shown in Table 2, the mean grain size was larger than 3 microns, and the strength was reduced.

Figure 1:
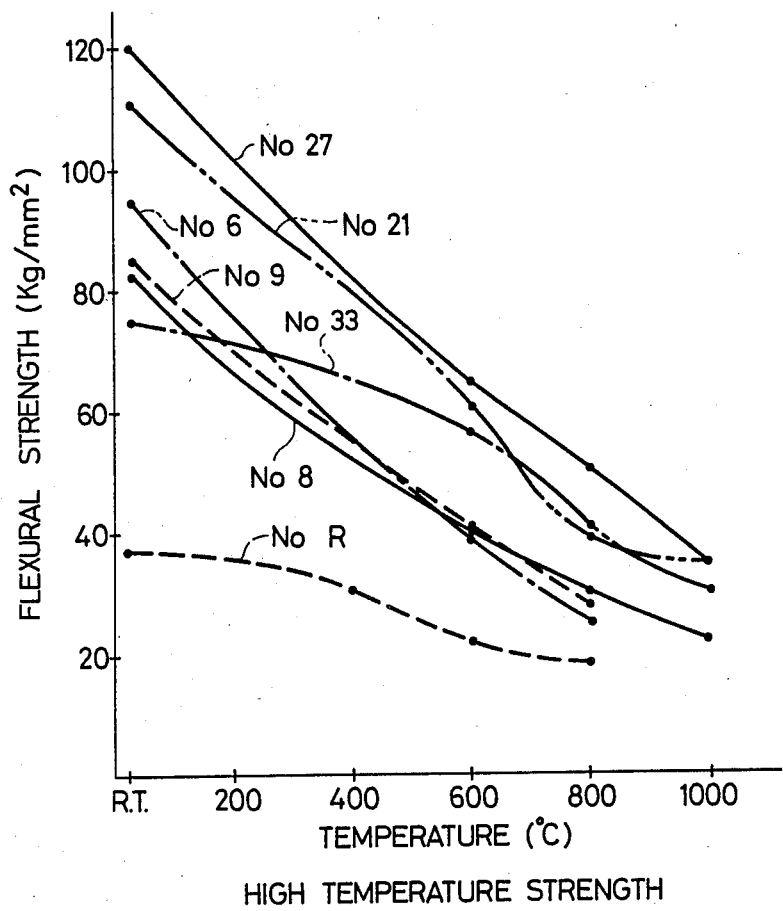
FIG. 1 shows the high temperature strength of sintered bodies described in Example 1 and of a comparative specimen (No. R), i.e., commercially available partially stabilized zirconia sintered body manufactured by Corning Corp.

As is shown clearly from Table 2, the addition of $Al_2O_3$ inhibits the transformation from the tetragonal $ZrO_2$ to the monoclinic $ZrO_2$ and increases the fraction of the tetragonal $ZrO_2$, improving the strength and toughness of the resulting sintered body. The hardness and high temperature flexural strength of some specimens were also measured. The results are shown in Table 3 and FIG. 1. It can be seen from the results that the hardness of the sintered body increased with increasing $Al_2O_3$ content, for example, the hardness of specimen No. 33 with 60% $Al_2O_3$ content was almost equal to that of $Al_2O_3$ ceramics, and that the high temperature strength is markedly improved compared with the comparative partially stabilized zirconia sintered body which is commercially available from Corning Corp., U.S.A. (Specimen No. R).

TABLE 1

| Crystal System | Monoclinic |
| --- | --- |
| Specific Surface Area | 25 m²/g |
| Chemical Analytical Values | |
| $ZrO_2$ (incl. $HfO_2$) | 99% or more (containing 3 to 5% $HfO_2$) |
| $SiO_2$ | 0.5% |
| CaO | 0.06% |
| $Fe_2O_3$ | 0.1% |
| $TiO_2$ | 0.25% |

TABLE 2

| Specimen No. | Composition $Al_2O_3$ (wt %) | Stabilizer for $ZrO_2$ Type | Stabilizer for $ZrO_2$ Amount (mol %) | Sintering Temperature (°C.) | Density (g/cm³) | Flexural Strength (kg/mm²) | $K_{IC}$ (kg/mm^{3/2}) | Crystal System of $ZrO_2$ Monoclinic (wt %) | Crystal System of $ZrO_2$ Tetragonal (wt %) | Crystal System of $ZrO_2$ Cubic (wt %) | Remarks |
| --- | --- | --- | --- | --- | --- | --- | --- | --- | --- | --- | --- |
| 1 | 0.1 | $Y_2O_3$ | 4 | 1,600 | 5.72 | 35.1 | 9.3 | 24 | 41 | 35 | Comparison |
| 2 | 0.5 | " | " | " | 5.80 | 70.5 | 21.0 | 9 | 58 | 33 | Present Invention |
| 3 | 1.5 | " | " | " | 5.83 | 72.4 | 22.5 | 4 | 64 | 32 | Present Invention |
| 4 | 3 | " | 1 | 1,500 | * | — | — | 95 | 0 | 5 | Comparison |
| 5 | " | " | 1.5 | 1,400 | 5.76 | 35.7 | 18.0 | 43 | 49 | 8 | " |
| 6 | " | " | 2 | 1,500 | 5.97 | 95.9 | 44.9 | 5 | 83 | 12 | Present Invention |
| 7 | " | " | 2.5 | " | 5.95 | 91.7 | 37.8 | 4 | 77 | 19 | Present Invention |
| 8 | " | " | 3 | 1,600 | 5.94 | 82.3 | 30.2 | 3 | 73 | 24 | Present Invention |
| 9 | " | " | 4 | " | 5.88 | 84.1 | 23.8 | 1 | 67 | 32 | Present Invention |
| 10 | " | " | 6 | " | 5.75 | 44.6 | 15.0 | 0 | 28 | 72 | Present Invention |
| 11 | " | " | 8 | " | 5.67 | 31.2 | 13.0 | 0 | 0 | 100 | Comparison |
| 12 | " | MgO | 7 | 1,500 | 5.75 | 70.0 | 21.0 | 3 | 61 | 36 | Present Invention |
| 13 | " | CaO | 6 | " | 5.78 | 65.0 | 19.0 | 4 | 55 | 41 | Present Invention |
| 14 | 10 | $Y_2O_3$ | 1 | 1,500 | * | — | — | 96 | 0 | 4 | Comparison |
| 15 | " | " | 2 | " | 5.71 | 99.4 | 38.8 | 4 | 85 | 11 | Present Invention |
| 16 | " | " | 3 | " | 5.69 | 87.2 | 32.5 | 2 | 76 | 22 | Present Invention |
| 17 | " | " | 4 | " | 5.64 | 85.3 | 30.0 | 1 | 70 | 29 | Present Invention |
| 18 | " | MgO | 7 | " | 5.53 | 72.5 | 29.1 | 0 | 68 | 32 | Present Invention |
| 19 | " | CaO | 6 | " | 5.55 | 67.4 | 27.3 | 0 | 63 | 37 | Present Invention |
| 20 | 20 | $Y_2O_3$ | 1 | " | 5.45 | 102.2 | 33.6 | 9 | 87 | 4 | Present Invention |
| 21 | " | " | 2 | " | 5.43 | 110.8 | 35.0 | 0 | 90 | 10 | Present Invention |
| 22 | " | " | 3 | " | 5.41 | 95.1 | 30.9 | 0 | 81 | 19 | Present Invention |
| 23 | " | " | 4 | " | 5.37 | 93.0 | 28.2 | 0 | 74 | 26 | Present Invention |
| 24 | " | MgO | 7 | " | 5.28 | 79.1 | 27.3 | 0 | 71 | 29 | Present Invention |
| 25 | " | CaO | 6 | " | 5.30 | 73.5 | 26.2 | 0 | 67 | 33 | Present Invention |
| 26 | 40 | $Y_2O_3$ | 1 | " | 4.97 | 107.3 | 27.7 | 0 | 97 | 3 | Present Invention |
| 27 | " | " | 2 | " | 4.96 | 121.3 | 26.8 | 0 | 93 | 7 | Present Invention |
| 28 | " | " | 3 | " | 4.94 | 106.4 | 25.5 | 0 | 86 | 14 | Present |

TABLE 2-continued

| Specimen No. | Composition Al₂O₃ (wt %) | Stabilizer for ZrO₂ Type | Stabilizer for ZrO₂ Amount (mol %) | Sintering Temperature (°C.) | Density (g/cm³) | Flexural Strength (kg/mm²) | $K_{IC}$ (kg/mm^{3/2}) | Crystal System of ZrO₂ Monoclinic (wt %) | Tetragonal (wt %) | Cubic (wt %) | Remarks |
|---|---|---|---|---|---|---|---|---|---|---|---|
| 29 | " | " | 4 | " | 4.92 | 104.1 | 24.5 | 0 | 81 | 19 | Present Invention |
| 30 | " | MgO | 7 | " | 4.87 | 88.5 | 23.9 | 0 | 78 | 22 | Present Invention |
| 31 | " | CaO | 6 | " | 4.88 | 82.2 | 23.4 | 0 | 75 | 25 | Present Invention |
| 32 | 60 | Y₂O₃ | 1 | 1,600 | 4.61 | 82.5 | 22.0 | 0 | 97 | 3 | Present Invention |
| 33 | " | " | 2 | " | 4.59 | 75.0 | 21.8 | 0 | 94 | 6 | Present Invention |
| 34 | " | " | 3 | " | 4.59 | 65.8 | 21.2 | 0 | 88 | 12 | Present Invention |
| 35 | " | " | 4 | " | 4.58 | 64.4 | 20.9 | 0 | 84 | 16 | Present Invention |
| 36 | " | MgO | 7 | " | 4.55 | 54.7 | 20.7 | 0 | 82 | 18 | Present Invention |
| 37 | " | CaO | 6 | " | 4.55 | 50.8 | 20.6 | 0 | 79 | 21 | Present Invention |
| 38 | 70 | Y₂O₃ | 2 | " | 4.43 | 43.3 | 11.5 | 0 | 94 | 6 | Comparison |

*disintegration

TABLE 3

| | Specimen No. | | | | |
|---|---|---|---|---|---|
| | 6 | 15 | 21 | 27 | 33 |
| Amount of Al₂O₃ (wt %) | 3 | 10 | 20 | 40 | 60 |
| Hardness | 83.5 | 84.0 | 85.1 | 86.5 | 87.7 |

Note:
Measurement of Physical Properties
(1) The flexural strength was measured according to JIS B4104-1970, and an average value of five specimens is indicated.
(2) The fracture toughness was measured according to ASTM Special Technical Publication No. 410; i.e., a specimen having a width of 4 mm, a thickness of 5 mm, and a length of 25 mm was provided with a notch having a depth of 0.5 mm and a width of 0.15 mm, and was measured by a three-point bending test with a span as 20 mm. An average value of five specimens is indicated.
(3) The hardness was measured by the use of a Rockwell Super Fischal hardness tester at a load of 45 kg.
(4) The crystal system was analyzed by X-ray diffraction using Geiger Flex Model RAD-γA manufactured by Rigaku Denki Co., Ltd. In the first place, by X-ray diffraction of a specimen which had been mirror-polished with a 15μ diamond paste, the integrated strength Im of each of the (111) plane and the (111) plane of monoclinic ZrO₂, the integrated strength It of the (111) plane of tetragonal ZrO₂, and the integrated strength Ic of the (111) plane of cubic ZrO₂ were measured, and the fraction of monoclinic ZrO₂ was determined by the ratio of Im/(Im + It + Ic). Then the sintered body was ground until all particles could pass through a 325 mesh screen and the ground particles were analyzed by X-ray diffraction under the same conditions as above to measure the integrated strength I'm of monoclinic ZrO₂ and the integrated strength I'c of cubic ZrO₂. In this case, it is considered that the residual tetragonal ZrO₂ in the sintered body is subjected to mechanical stress by the above-described pulverization and undergoes a transformation into monoclinic ZrO₂. Therefore, the fraction of cubic ZrO₂ is determined by the ratio of I'c/(I'm + I'c)

TABLE 3-continued

| | Specimen No. | | | | |
|---|---|---|---|---|---|
| | 6 | 15 | 21 | 27 | 33 | and then the fraction of tetragonal ZrO₂ is determined.

EXAMPLE 2

Figure 2:
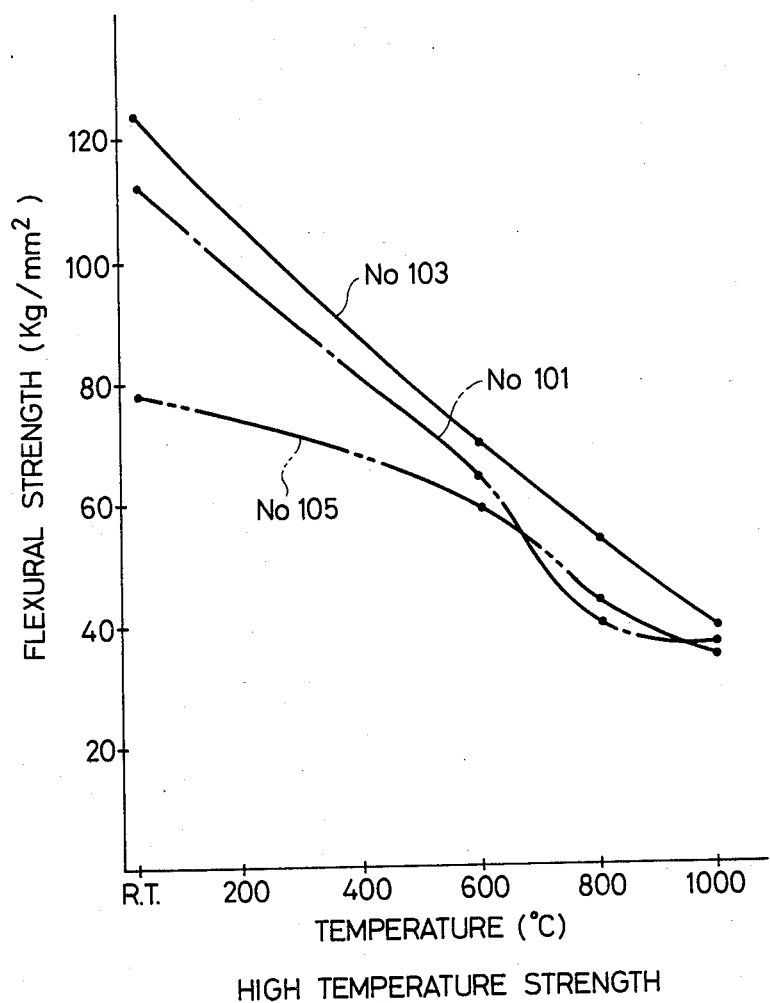
FIG. 2 shows the high temperature strength of sintered bodies described in Example 2.

An aqueous solution of zirconium oxychloride and an aqueous solution of yttrium chloride were mixed, co-precipitated, and calcined at 800° C. to prepare a powder consisting of ZrO₂ and Y₂O₃. The characteristics of the powder are shown in Table 4. To the co-precipitated powder was added Al₂O₃ powder having a mean particle size of 0.1 μm and a purity of 99.9% in the proportions shown in Table 5. Using the powder, a sintered body was produced in the same manner as in Example 1. The results are shown in Table 5. The high temperature strength was measured in the same manner as in Example 1, and the results are shown in FIG. 2. It can be seen from the results that even when the co-precipitated ZrO₂ powder is used, the addition of Al₂O₃ provides a great effect, as was the case in Example 1.

TABLE 4

| Amount of Y₂O₃ | 2 mol % | 3 mol % |
|---|---|---|
| Crystal System | Tetragonal | Tetragonal |
| Specific Surface Area | 32 m²/g | 34 m²/g |
| Chemical Analytical Values | | |
| ZrO₂ (incl. HfO₂) | 95% (containing 3 to 5% HfO₂) | 93.7% (containing 3 to 5% HfO₂) |
| Y₂O₃ | 4.04% | 5.30% |
| CaO | 0.09% | 0.06% |
| Na₂O | 0.05% | 0.05% |

TABLE 5

| Specimen No. | Composition Al₂O₃ (wt %) | Stabilizer for ZrO₂ Type | Stabilizer for ZrO₂ Amount (mol %) | Sintering Temperature (°C.) | Density (g/cm³) | Flexural Strength (kg/mm²) | $K_{IC}$ (kg/mm$^{3/2}$) | Crystal System of ZrO₂ Monoclinic (wt %) | Crystal System of ZrO₂ Tetragonal (wt %) | Crystal System of ZrO₂ Cubic (wt %) | Remarks |
|---|---|---|---|---|---|---|---|---|---|---|---|
| 101 | 20 | Y₂O₃ | 2 | 1,500 | 5.51 | 112.5 | 35.4 | 0 | 94 | 6 | Present Invention |
| 102 | " | " | 3 | " | 5.48 | 96.7 | 31.2 | 0 | 87 | 13 | Present Invention |
| 103 | 40 | " | 2 | " | 5.03 | 124.0 | 27.3 | 0 | 97 | 3 | Present Invention |
| 104 | " | " | 3 | " | 5.01 | 108.1 | 25.9 | 0 | 90 | 10 | Present Invention |
| 105 | 60 | " | 2 | 1,600 | 4.63 | 78.3 | 22.1 | 0 | 97 | 3 | Present Invention |
| 106 | " | " | 3 | " | 4.62 | 70.1 | 21.5 | 0 | 91 | 9 | Present Invention |

EXAMPLE 3

To a monoclinic ZrO₂ having the characteristics shown in Table 1 above were added Y₂O₃, CaO, or MgO as a stabilizer in the proportions shown in Table 6, and then fine particles of TiN having a mean particle size of 0.1 micron and a purity of 99.9% were added in proportions as shown in Table 6. The ingredients were then wet-mixed, and the resulting mixture was dried, powdered, press-molded, and sintered in an electric furnace in N₂ atmosphere at 1,400° to 1,650° C. for 1 hour. After sintering, the thus-obtained sintered body was cut and ground to form a specimen of 4×8×25 mm. In this way, a series of specimens were produced. The phase composition and properties obtained from these specimens are shown in Table 6. In all the specimens, the mean grain size was less than 3 microns. When the sintering temperature was increased to higher temperature than those shown in Table 6, the mean grain size was larger than 3 microns, and the strength was reduced.

Figure 3:
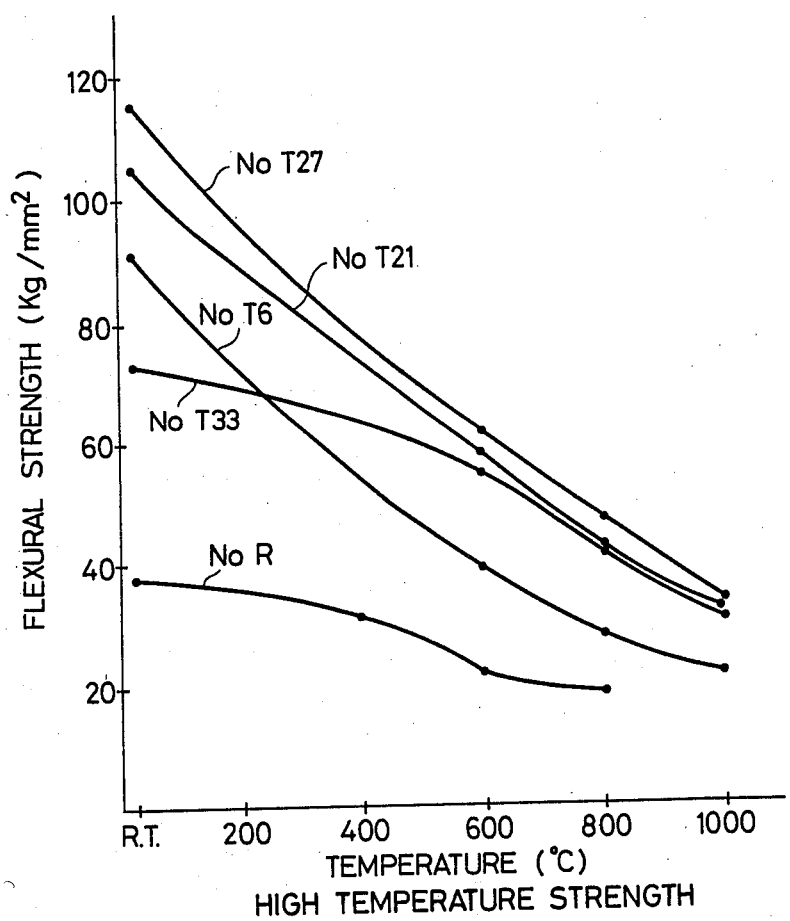
FIG. 3 shows the high temperature strength of sintered bodies described in Example 3 and of the above-described comparative specimen (No. R).

As is shown clearly from Table 6, the addition of TiN inhibits the transformation from the tetragonal ZrO₂ to the monoclinic ZrO₂ and increases the fraction of the tetragonal ZrO₂, improving the strength and toughness of the resulting sintered body. The hardness and high temperature flexural strength of some specimens were also measured. The results are shown in Table 7 and FIG. 3. It can be seen from the results that the addition of TiN greatly increases the hardness and strength, and in particular, the high temperature strength is markedly improved compared with the comparative partially stabilized zirconia sintered body which is commercially available from Corning Corp., U.S.A. (Specimen No. R).

TABLE 6

| Specimen No. | Composition TiN (wt %) | Stabilizer for ZrO₂ Type | Stabilizer for ZrO₂ Amount (mol %) | Sintering Temperature (°C.) | Density (g/cm³) | Flexural Strength (kg/mm²) | $K_{IC}$ (kg/mm$^{3/2}$) | Crystal System of ZrO₂ Monoclinic (wt %) | Crystal System of ZrO₂ Tetragonal (wt %) | Crystal System of ZrO₂ Cubic (wt %) | Remarks |
|---|---|---|---|---|---|---|---|---|---|---|---|
| T1 | 0.1 | Y₂O₃ | 4 | 1,600 | 5.74 | 33.4 | 10.8 | 27 | 38 | 35 | Comparison |
| T2 | 0.5 | " | " | " | 5.83 | 67.0 | 29.5 | 10 | 57 | 33 | Present Invention |
| T3 | 1.5 | " | " | " | 5.86 | 68.8 | 33.8 | 6 | 63 | 31 | Present Invention |
| T4 | 3 | " | 1 | 1,400 | * | — | — | 96 | 0 | 4 | Comparison |
| T5 | " | " | 1.5 | " | 5.79 | 33.9 | 19.3 | 44 | 47 | 9 | " |
| T6 | " | " | 2 | 1,500 | 6.01 | 91.1 | 45.3 | 7 | 82 | 11 | Present Invention |
| T7 | " | " | 2.5 | " | 5.99 | 87.1 | 42.4 | 5 | 76 | 19 | Present Invention |
| T8 | " | " | 3 | 1,600 | 5.97 | 79.9 | 41.5 | 4 | 73 | 23 | Present Invention |
| T9 | " | " | 4 | " | 5.91 | 78.2 | 38.7 | 2 | 64 | 34 | Present Invention |
| T10 | " | " | 6 | " | 5.79 | 42.4 | 16.1 | 0 | 25 | 75 | Present Invention |
| T11 | " | " | 8 | " | 5.70 | 29.6 | 15.3 | 0 | 0 | 100 | Comparison |
| T12 | " | MgO | 7 | 1,500 | 5.78 | 66.5 | 37.1 | 4 | 59 | 37 | Present Invention |
| T13 | " | CaO | 6 | " | 5.80 | 61.8 | 35.2 | 5 | 53 | 42 | Present Invention |
| T14 | 10 | Y₂O₃ | 1 | " | * | — | — | 97 | 0 | 3 | Comparison |
| T15 | " | " | 2 | " | 5.95 | 94.4 | 43.2 | 6 | 85 | 9 | Present Invention |
| T16 | " | " | 3 | " | 5.91 | 82.8 | 40.7 | 3 | 76 | 21 | Present Invention |
| T17 | " | " | 4 | " | 5.86 | 81.0 | 39.1 | 1 | 70 | 29 | Present Invention |
| T18 | " | MgO | 7 | " | 5.74 | 68.9 | 38.7 | 0 | 69 | 31 | Present Invention |
| T19 | " | CaO | 6 | " | 5.76 | 64.1 | 37.6 | 0 | 65 | 35 | Present |

TABLE 6-continued

| Specimen No. | Composition | | | Sintering Temperature (°C.) | Density (g/cm³) | Flexural Strength (kg/mm²) | $K_{IC}$ (kg/mm$^{3/2}$) | Crystal System of $ZrO_2$ | | | Remarks |
|---|---|---|---|---|---|---|---|---|---|---|---|
| | TiN (wt %) | Stabilizer for $ZrO_2$ | | | | | | Monoclinic (wt %) | Tetragonal (wt %) | Cubic (wt %) | |
| | | Type | Amount (mol %) | | | | | | | | |
| T20 | 20 | $Y_2O_3$ | 1 | " | 5.91 | 97.1 | 41.4 | 9 | 88 | 3 | Present Invention |
| T21 | " | " | 2 | " | 5.89 | 105.3 | 41.1 | 5 | 87 | 8 | Present Invention |
| T22 | " | " | 3 | " | 5.85 | 90.5 | 39.7 | 0 | 81 | 19 | Present Invention |
| T23 | " | " | 4 | " | 5.81 | 88.4 | 37.7 | 0 | 73 | 27 | Present Invention |
| T24 | " | MgO | 7 | " | 5.71 | 75.1 | 36.8 | 0 | 70 | 30 | Present Invention |
| T25 | " | CaO | 6 | " | 5.72 | 69.8 | 35.8 | 0 | 66 | 34 | Present Invention |
| T26 | 40 | $Y_2O_3$ | 1 | " | 5.71 | 101.4 | 37.8 | 0 | 98 | 2 | Present Invention |
| T27 | " | – | 2 | " | 5.69 | 115.3 | 36.9 | 0 | 94 | 6 | Present Invention |
| T28 | " | " | 3 | " | 5.67 | 101.2 | 35.5 | 0 | 87 | 13 | Present Invention |
| T29 | " | " | 4 | " | 5.64 | 98.9 | 33.9 | 0 | 80 | 20 | Present Invention |
| T30 | " | MgO | 7 | " | 5.56 | 84.1 | 33.7 | 0 | 79 | 21 | Present Invention |
| T31 | " | CaO | 6 | " | 5.57 | 78.2 | 32.4 | 0 | 74 | 26 | Present Invention |
| T32 | 60 | $Y_2O_3$ | 1 | 1,600 | 5.59 | 78.4 | 29.7 | 0 | 98 | 2 | Present Invention |
| T33 | " | " | 2 | " | 5.58 | 72.3 | 28.3 | 0 | 93 | 7 | Present Invention |
| T34 | " | " | 3 | " | 5.56 | 62.9 | 27.1 | 0 | 89 | 11 | Present Invention |
| T35 | " | " | 4 | " | 5.54 | 62.3 | 25.6 | 0 | 85 | 15 | Present Invention |
| T36 | " | MgO | 7 | " | 5.49 | 52.1 | 23.7 | 0 | 81 | 19 | Present Invention |
| T37 | " | CaO | 6 | " | 5.50 | 49.5 | 22.9 | 0 | 80 | 20 | Present Invention |
| T38 | 70 | $Y_2O_3$ | 2 | " | 5.52 | 41.1 | 13.2 | 0 | 94 | 6 | Comparison |
| T39 | " | MgO | 7 | " | 5.46 | 39.6 | 12.6 | 0 | 84 | 16 | " |
| T40 | " | CaO | 6 | " | 5.47 | 38.4 | 10.8 | 0 | 79 | 21 | " |

*disintegration

TABLE 7

| | Specimen No. | | | | |
|---|---|---|---|---|---|
| | T6 | T15 | T21 | T27 | T33 |
| Amount of TiN (wt %) | 3 | 10 | 20 | 40 | 60 |
| Hardness | 83.4 | 83.8 | 84.5 | 85.7 | 86.1 |

EXAMPLE 4

Figure 4:
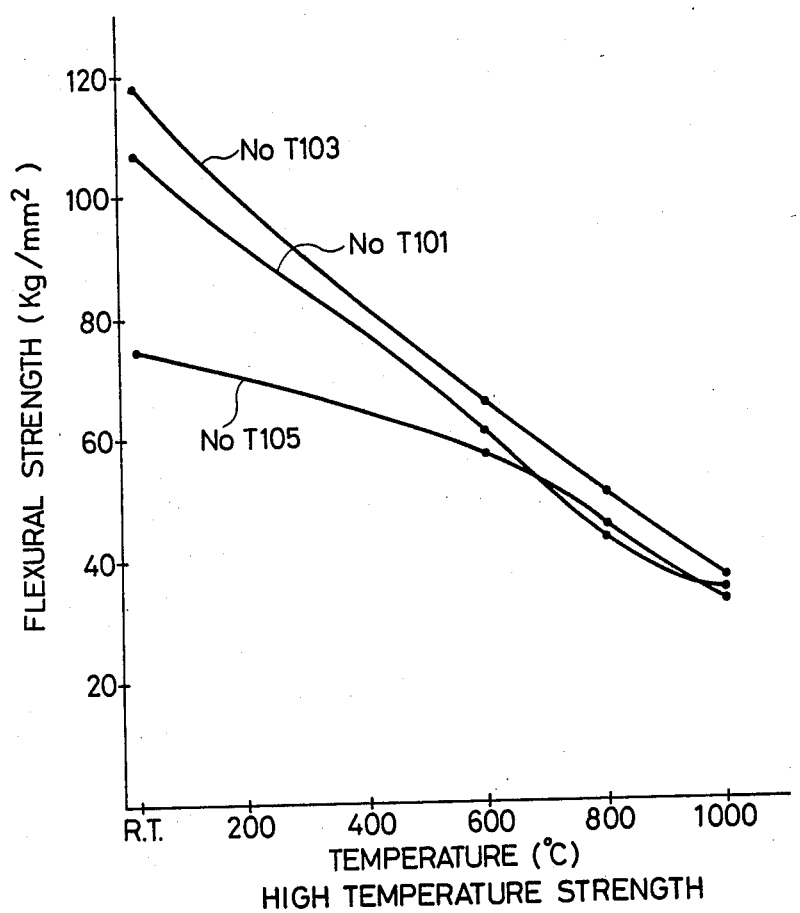
FIG. 4 shows the high temperature strength of sintered bodies described in Example 4.

An aqueous solution of zirconium oxychloride and an aqueous solution of yttrium chloride were mixed, co-precipitated, and calcined at 800° C. to prepare a powder consisting of $ZrO_2$ and $Y_2O_3$. The characteristics of the powder are shown above in Table 4. To the co-precipitated powder was added TiN powder having a mean particle size of 0.1 μm and a purity of 99.9% in the proportions shown in Table 8. Using the powder, a sintered body was produced in the same manner as in Example 3. The results are shown in Table 8. The high temperature strength was measured in the same manner as in Example 1, and the results are shown in FIG. 4. It can be seen from the results that even when the co-precipitated $ZrO_2$ powder is used, the addition of TiN provides a great effect, as was the case with Example 3.

TABLE 8

| Specimen No. | Composition | | | Sintering Temperature (°C.) | Density (g/cm³) | Flexural Strength (kg/mm²) | $K_{IC}$ (kg/mm$^{3/2}$) | Crystal System of $ZrO_2$ | | | Remarks |
|---|---|---|---|---|---|---|---|---|---|---|---|
| | TiN (wt %) | Stabilizer for $ZrO_2$ | | | | | | Monoclinic (wt %) | Tetragonal (wt %) | Cubic (wt %) | |
| | | Type | Amount (mol %) | | | | | | | | |
| T101 | 20 | $Y_2O_3$ | 2 | 1,500 | 5.95 | 106.9 | 41.5 | 6 | 89 | 5 | Present Invention |
| T102 | " | " | 3 | " | 5.91 | 91.9 | 41.1 | 0 | 87 | 13 | Present Invention |
| T103 | 40 | " | 2 | " | 5.81 | 117.8 | 37.3 | 0 | 96 | 4 | Present Invention |
| T104 | " | " | 3 | " | 5.78 | 102.7 | 35.9 | 0 | 89 | 11 | Present Invention |
| T105 | 60 | " | 2 | 1,600 | 5.68 | 74.4 | 29.6 | 0 | 97 | 3 | Present |

TABLE 8-continued

| Specimen No. | Composition | | | Sintering Temperature (°C.) | Density (g/cm³) | Flexural Strength (kg/mm²) | $K_{IC}$ (kg/mm$^{3/2}$) | Crystal System of ZrO$_2$ | | | Remarks |
| --- | --- | --- | --- | --- | --- | --- | --- | --- | --- | --- | --- |
| | TiN (wt %) | Stabilizer for ZrO$_2$ | | | | | | Mono-clinic (wt %) | Tetra-gonal (wt %) | Cubic (wt %) | |
| | | Type | Amount (mol %) | | | | | | | | |
| T106 | " | " | 3 | " | 5.66 | 66.8 | 27.5 | 0 | 90 | 10 | Invention Present Invention |

EXAMPLE 5

To a 1 mol% solution of zirconium oxychloride having a purity of 99.9% (wherein the ZrO$_2$ component contains 3 to 5% of HfO$_2$) were added yttrium chloride, magnesium chloride or calcium chloride as a stabilizer, all having a purity of 99.9%, and aluminum chloride having a purity of 99.9% so as to prepare a mixture having the composition shown in Table 9. They were uniformly mixed and then co-precipitated to obtain a hydroxide mixture. The hydroxide mixture thus prepared was dehydrated, dried, and calcined at 800° C. to obtain a starting powder having a mean particle size of 200 Å. The thus-obtained powder was press-molded at a pressure of 1.5 ton/cm$^2$, and sintered in an electric furnace in the air at 1,400° to 1,650° C. for 1 hour. After sintering, the resulting sintered body was cut and ground to provide a specimen of 4×8×25 mm. In this way, a series of sintered bodies were produced. In all of the sintered bodies, the mean grain size was less than 3 microns. However, when the sintering temperature was increased to higher temperatures than those shown in Table 9, the mean grain sizes of resulting sintered bodies were larger than 3 microns, resulting in a reduction in strength.

Figure 5:
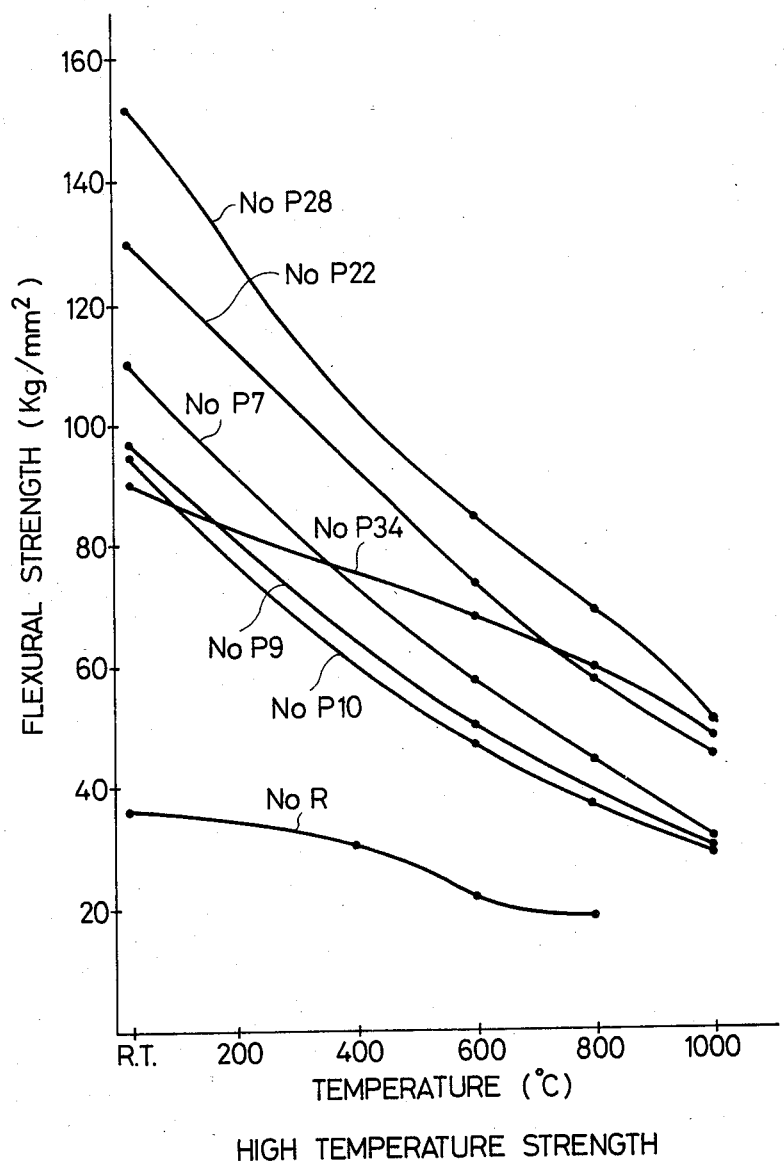
FIG. 5 shows the high temperature strength of sintered bodies described in Example 5 and of the above-described comparative specimen (No. R).

As shown clearly from Table 9, the co-precipitation of Al$_2$O$_3$ inhibits the transformation from the tetragonal ZrO$_2$ to the monoclinic ZrO$_2$ and increases the fraction of the tetragonal ZrO$_2$, improving the strength and toughness. The hardness and high temperature flexural strength of some specimens were also measured. The results are shown in Table 10 and FIG. 5. It can be seen from the results that the hardness of the sintered body increased with increasing Al$_2$O$_3$ content, for example, the hardness of the specimen No. P34 with 60% Al$_2$O$_3$ content was almost equal to that of Al$_2$O$_3$ ceramics, and that the high temperature strength markedly improved compared with the comparative partially stabilized zirconia sintered body commercially available from Corning Corp., U.S.A. (Specimen No. R).

TABLE 9

| Specimen No. | Composition | | | Sintering Temperature (°C.) | Density (g/cm³) | Flexural Strength (kg/mm²) | $K_{IC}$ (kg/mm$^{3/2}$) | Crystal System of ZrO$_2$ | | | Remarks |
| --- | --- | --- | --- | --- | --- | --- | --- | --- | --- | --- | --- |
| | Al$_2$O$_3$ (wt %) | Stabilizer for ZrO$_2$ | | | | | | Mono-clinic (wt %) | Tetra-gonal (wt %) | Cubic (wt %) | |
| | | Type | Amount (mol %) | | | | | | | | |
| P1 | 0 | Y$_2$O$_3$ | 4 | 1,600 | 6.04 | 60.7 | 18.9 | 8 | 57 | 35 | Comparison |
| P2 | 0.1 | " | 4 | " | 6.04 | 63.5 | 20.1 | 3 | 63 | 34 | " |
| P3 | 0.5 | " | 4 | " | 6.02 | 81.1 | 22.6 | 1 | 65 | 34 | Present Invention |
| P4 | 1.5 | " | 4 | " | 5.99 | 83.3 | 23.8 | 0 | 67 | 33 | Present Invention |
| P5 | 3 | " | 1 | 1,400 | * | — | — | 96 | 0 | 4 | Comparison |
| P6 | " | " | 1.5 | " | 5.91 | 41.1 | 18.1 | 41 | 52 | 7 | " |
| P7 | " | " | 2 | 1,500 | 6.00 | 110.3 | 47.1 | 4 | 85 | 11 | Present Invention |
| P8 | " | " | 2.5 | " | 5.99 | 105.5 | 39.7 | 3 | 79 | 18 | Present Invention |
| P9 | " | " | 3 | " | 5.97 | 96.7 | 31.7 | 1 | 76 | 23 | Present Invention |
| P10 | " | " | 4 | 1,600 | 5.95 | 94.6 | 25.0 | 0 | 68 | 32 | Present Invention |
| P11 | " | " | 6 | " | 5.88 | 51.3 | 15.8 | 0 | 26 | 74 | Present Invention |
| P12 | " | " | 8 | " | 5.76 | 35.7 | 13.7 | 0 | 0 | 100 | Comparison |
| P13 | " | MgO | 7 | 1,500 | 5.78 | 80.5 | 22.1 | 2 | 63 | 35 | Present Invention |
| P14 | 3 | CaO | 6 | " | 5.81 | 74.8 | 20.0 | 3 | 57 | 40 | Present Invention |
| P15 | 10 | Y$_2$O$_3$ | 1 | " | * | — | — | 97 | 0 | 3 | Comparison |
| P16 | " | " | 2 | " | 5.79 | 117.3 | 41.5 | 2 | 89 | 9 | Present Invention |
| P17 | " | " | 3 | " | 5.76 | 102.9 | 34.8 | 1 | 80 | 19 | Present Invention |
| P18 | " | " | 4 | 1,600 | 5.74 | 100.7 | 32.1 | 0 | 73 | 27 | Present Invention |
| P19 | " | MgO | 7 | 1,500 | 5.56 | 85.6 | 31.1 | 0 | 71 | 29 | Present Invention |
| P20 | " | CaO | 6 | " | 5.58 | 79.5 | 29.2 | 0 | 67 | 33 | Present Invention |
| P21 | 20 | Y$_2$O$_3$ | 1 | " | 5.52 | 120.6 | 36.6 | 5 | 93 | 2 | Present Invention |
| P22 | " | " | 2 | " | 5.51 | 130.7 | 38.2 | 0 | 95 | 5 | Present Invention |

TABLE 9-continued

| Specimen No. | Composition Al$_2$O$_3$ (wt %) | Stabilizer for ZrO$_2$ Type | Stabilizer for ZrO$_2$ Amount (mol %) | Sintering Temperature (°C.) | Density (g/cm$^3$) | Flexural Strength (kg/mm$^2$) | $K_{IC}$ (kg/mm$^{3/2}$) | Crystal System of ZrO$_2$ Monoclinic (wt %) | Crystal System of ZrO$_2$ Tetragonal (wt %) | Crystal System of ZrO$_2$ Cubic (wt %) | Remarks |
|---|---|---|---|---|---|---|---|---|---|---|---|
| P23 | " | " | 3 | " | 5.49 | 112.2 | 33.7 | 0 | 89 | 11 | Present Invention |
| P24 | " | " | 4 | 1,600 | 5.48 | 109.7 | 30.7 | 0 | 78 | 22 | Present Invention |
| P25 | " | MgO | 7 | 1,500 | 5.31 | 93.3 | 29.8 | 0 | 75 | 25 | Present Invention |
| P26 | " | CaO | 6 | " | 5.33 | 86.7 | 28.6 | 0 | 71 | 29 | Present Invention |
| P27 | 40 | Y$_2$O$_3$ | 1 | " | 5.03 | 134.1 | 31.0 | 0 | 98 | 2 | Present Invention |
| P28 | " | " | 2 | " | 5.03 | 151.6 | 30.1 | 0 | 96 | 4 | Present Invention |
| P29 | " | " | 3 | " | 5.02 | 133.0 | 28.6 | 0 | 93 | 7 | Present Invention |
| P30 | " | " | 4 | 1,600 | 5.01 | 130.1 | 27.4 | 0 | 86 | 14 | Present Invention |
| P31 | " | MgO | 7 | 1,500 | 4.89 | 110.6 | 26.8 | 0 | 81 | 19 | Present Invention |
| P32 | " | CaO | 6 | " | 4.90 | 102.8 | 26.2 | 0 | 79 | 21 | Present Invention |
| P33 | 60 | Y$_2$O$_3$ | 1 | 1,600 | 4.63 | 98.9 | 24.2 | 0 | 100 | 0 | Present Invention |
| P34 | " | " | 2 | " | 4.63 | 90.2 | 23.9 | 0 | 98 | 2 | Present Invention |
| P35 | " | " | 3 | " | 4.62 | 78.9 | 23.3 | 0 | 94 | 6 | Present Invention |
| P36 | " | " | 4 | " | 4.62 | 77.3 | 23.1 | 0 | 89 | 11 | Present Invention |
| P37 | " | MgO | 7 | " | 4.57 | 65.6 | 22.8 | 0 | 85 | 15 | Present Invention |
| P38 | " | CaO | 6 | " | 4.58 | 61.0 | 22.7 | 0 | 81 | 19 | Present Invention |
| P39 | 70 | Y$_2$O$_3$ | 2 | " | 4.45 | 49.8 | 12.7 | 0 | 98 | 2 | Comparison |
| P40 | " | MgO | 7 | " | 4.39 | 48.0 | 11.5 | 0 | 86 | 14 | " |
| P41 | " | CaO | 6 | " | 4.40 | 46.6 | 10.2 | 0 | 83 | 17 | " |

*disintegration

TABLE 10

| | Specimen No. | | | | |
|---|---|---|---|---|---|
| | P7 | P16 | P22 | P28 | P34 |
| Amount of Al$_2$O$_3$ (wt %) | 3 | 10 | 20 | 40 | 60 |
| Hardness | 83.6 | 84.2 | 85.1 | 86.7 | 87.8 |

While the invention has been described in detail and with reference to specific embodiments thereof, it will be apparent to one skilled in the art that various changes and modifications can be made therein without departing from the spirit and scope thereof.

What is claimed is:

1. A high toughness sintered body consisting essentially of from 40 to 99.5% by weight Component A and from 0.5 to 60% by weight Component B, wherein the mean grain size of the sintered body is 3 microns or less, wherein:

Component A is partially stabilized ZrO$_2$ which contains 1 to 6 mol% of Y$_2$O$_3$, 7 mol% of MgO or 6 mol% of CaO as a stabilizer in which tetragonal and cubic ZrO$_2$ constitute at least 90% by weight thereof and the ratio of the tetragonal ZrO$_2$ to the cubic ZrO$_2$ is at least $\frac{1}{3}$; and Component B is TiN, with impurities being 3% by weight or less of SiO$_2$, 0.5% by weight or less of Fe$_2$O$_3$, and 0.5% by weight or less of TiO$_2$, provided that the total amount is 3% by weight or less.

2. A sintered body as in claim 1, wherein the whole or part of the ZrO$_2$ is replaced by HfO$_2$.

3. A sintered body as in claim 1, wherein the partially stabilized ZrO$_2$ and the stabilizer are prepared by co-precipitation.

4. A sintered body as in claim 2, wherein the partially stabilized ZrO$_2$ and the HfO$_2$ which replaces part of the ZrO$_2$ or the HfO$_2$ which replaces the whole of the ZrO$_2$ and the stabilizer are prepared by co-precipitation.

* * * * *